May 11, 1965　　F. A. VAN DER SLUIS　　3,182,973
PROCESS FOR THE STABILIZATION OF SOIL MIXTURES
Filed Feb. 15, 1963
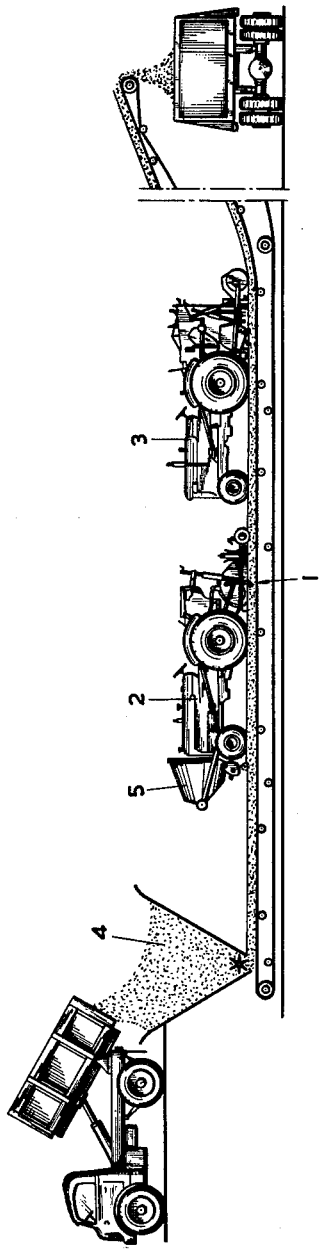
INVENTOR
*Freerk Anne Van Der Sluis*
BY *Stevens, Davis, Miller & Mosher*
ATTORNEYS 3,182,973
PROCESS FOR THE STABILIZATION OF
SOIL MIXTURES
Freerk Anne van der Sluis, Arnhem, Netherlands, assignor to Nederlandsche Heide-Maatschappij, Arnhem, Netherlands, a corporation of the Netherlands
Filed Feb. 15, 1963, Ser. No. 258,699
Claims priority, application Netherlands, Feb. 19, 1962, 274,961
2 Claims. (Cl. 259—148)

The invention relates to a process for stabilizing mixtures of soil with binders so as to obtain a material for road-surfacing, coating of slopes, building foundations, cores of dams, and the like, with the aid of a road construction machine of the mix-in-place type equipped with high-speed cutting and striking means and adapted to loosen the original soil on the site and to mix it with the stabilizers and with additives, if required. Such a process as well as a machine for carrying out this process are known and in common use.

There are three principal methods for stabilizing soils, (1) mix-in-place, (2) travelling plant, and (3) stationary plant. In the "mix-in-place" method the soil is stabilized in its original position by running machines such as tractors, cultivators, etc. over the soil to be processed. In a travelling plant the soil is scooped up from its original position into an apparatus which is moving along the road bed. Stabilizer may be added to the soil which is then further processed and discharged at the rear end of the apparatus back onto the road bed. In a stationary plant the soil is transported by truck or the like to a stationary apparatus for treatment, and thereafter transported to the point of use.

In practice it repeatedly happens that the mix-in-place process can not efficiently be applied with the conventional machine, if for instance the top soil is unsuitable for stabilization and has to be removed. Under these circumstances the preparation of stabilized soil is performed with the aid of a conventional stationary mixer, which mixes the components to be mixed after they have been supplied to this machine. The mixed material is then carried to the road, dam, or the like, where it undergoes a further treatment. Dependent upon the question of whether the soil present on the site is suitable for stabilization, or suitable soil, and in particular in the form of different types of soil, has to be supplied from elsewhere to replace the original soil or be admixed therewith, a choice will be made between the two construction methods. For a higher output, especially with thicker layers, the mix-in-place machine will as a rule be less expensive than the stationary plant. It is an object of the invention to make the movable mix-in-place machines suitable for use in a stationary plant.

According to the invention this is achieved in that the mix-in-place stabilizer in question is mounted away from the road, dam, or the like over a conveyor, on to which the basic materials are dosed from storage silos and/or other storage apparatus, after which the mixed material is carried to the road, dam, or the like, where it undergoes a further process. Thus, instead of the machine travelling over the soil to be stabilized, the soil is passed underneath the machine. In consequence the machine can therefore be used as a moving mix-in-place machine as well as a stationary mixing plant. The output can even be greater when the machine is used as a stationary mixer, than when it is used as a mix-in-place machine, because the stationary mixer can always operate with the maximum depth adjustment of the machine, while the speed of the conveyor can be increased to a higher value than will generally be possible with the normal maximum operating speed, when the mixer is used as a mix-in-place machine, since loose soil is being mixed. With the material thus obtained the area spread with it in a unit of time, especially when the thickness of the layers is less than the maximum adjustment depth of the machine, can be greater than if the machine itself were to operate on the road. The travelling properties are of course superflous when the machine is used as a stationary stabilizer. Moreover, with stationary use the advantage makes itself felt that the high-speed cutting and striking means will comminute any cohesive soils, such as clays, more satisfactorily than is possible with conventional stationary plants, while the machine also operates at greater speeds with clay when stationary than when it is used on the road under construction, since on clayey soils the machine can move only laboriously and the efficiency of the comminuting and mixing members is only small as insufficient quantities of material are supplied. The high speed cutting and striking means which serve to comminute clayey soil are known per se and the details thereof do not form part of the present invention.

The present invention will now be explained further by reference to the annexed drawing, showing schematically an embodiment of the invention.

The drawing shows an endless conveyor 1, over which are placed two soil-cement road-constructing machines 2 and 3 complementing each other and having suitable comminuting means and mixing means for treating the soil on conveyor 1. Dosing of sand and gravel is done through the bunker 4, and the cement is metered from the container 5 mounted on the machine 2. The last portion of the conveyor is inclined upwards in the embodiment shown, so as to enable the processed material to be removed at once in a truck.

What I claim is:
1. A process for stabilizing soil, comprising the steps of feeding the soil onto a substantially horizontal endless conveyer which is mounted upon relatively stationary support means, regulating the amount of feed to obtain a layer of soil of predetermined thickness upon the endless conveyor, positioning tractor means having comminuting means and binder supply means above said endless conveyer in position to operate upon the layer of soil, comminuting the layer of soil, introducing binder into the layer of soil upon the endless conveyer, and discharging treated soil from the conveyer for transportation to a point of subsequent use.
2. Apparatus for stabilizing soil, comprising an endless conveyer having a substantially horizontal portion of extended length, relatively stationary support means for supporting said endless conveyer therein while enabling movement thereof, means for feeding soil onto said conveyer in a layer of predetermined thickness, tractor means positioned above said endless conveyer and having comminuting means for treating the layer of soil on said endless conveyer, means for supplying a binder to the layer of soil, and means for discharging treated soil from the horizontal portion of said endless conveyer.

References Cited by the Examiner
UNITED STATES PATENTS

| | | | |
|---|---|---|---|
| 2,195,221 | 3/40 | Millikin | 94—40 |
| 2,201,493 | 5/40 | Jorgensen | 94—40 |
| 2,420,368 | 5/47 | Giordano | 94—40 |

CHARLES A. WILLMUTH, *Primary Examiner.*